United States Patent [19]
Braggins et al.

[11] 3,835,973
[45] Sept. 17, 1974

[54] TORQUE LIMITING DEVICE

[75] Inventors: George Roderick Derham Braggins, Virginia Water; Donald Humphrey Pooley, Woodley, both of England

[73] Assignee: The Wellman Bibby Company Limited, Staines, Middlesex, England

[22] Filed: Sept. 25, 1972

[21] Appl. No.: 291,800

[30] Foreign Application Priority Data
Sept. 30, 1971 Great Britain............... 45555/71

[52] U.S. Cl............................................ 192/56 R
[51] Int. Cl........................................... F16d 43/20
[58] Field of Search............... 192/56 R, 150; 64/29

[56] References Cited
UNITED STATES PATENTS

| | | | |
|---|---|---|---|
| 2,514,227 | 7/1950 | Dodge | 192/56 R X |
| 2,852,972 | 9/1958 | Larson | 192/56 R X |
| 2,969,133 | 1/1961 | Langheck | 192/56 R |
| 3,036,447 | 5/1962 | Wilhelmsson et al. | 64/29 |
| 3,752,277 | 8/1973 | Nakai | 192/56 R |

Primary Examiner—Allan D. Herrmann
Attorney, Agent, or Firm—Woodhams, Blanchard and Flynn

[57] ABSTRACT

In a torque limiting device, torque is transmitted between first and second coaxial torque members by a rolling element. The rolling element is seated in a seating in the first torque member and located in an aperture in the second torque member. The rolling element is held in its seating by a cam surface on a locking member and on overload, is movable in the aperture out of the seating by moving the locking member in a circumferential direction against a resilient bias.

12 Claims, 4 Drawing Figures

TORQUE LIMITING DEVICE

The present invention relates to torque limiting devices which give an automatic and complete release when torque loaded beyond some predetermined limiting value.

A known torque limiting device, described in British Patent Specification No. 899,676 comprises an outer torque member which carries rollers arranged in axial slots in the torque member. In the engaged position of the clutch the rollers are seated in axial grooves in an inner torque member, and are held in their seatings by spring rings or circlips at torque values below a predetermined limiting value.

A problem with the known devices of this type is that after an overload torque has caused the device to disengage, the device continually resets as the rollers return to their seatings and leave them again due to the overload. This hammering causes considerable wear of the component parts.

The object of the present invention is to provide a torque limiting device which gives a complete release on overload and is quickly reset without requiring large forces.

Accordingly the present invention is characterised in that the rolling element is held in its seating by a cam surface on a locking member and, on overload, is movable in the aperture out of the seating by moving the locking member in a circumferential direction against the resilient bias.

Preferably the input drive is to the second torque member.

The present invention will now be described, by way of example, with reference to the accompanying drawings, in which.

Figure 1:
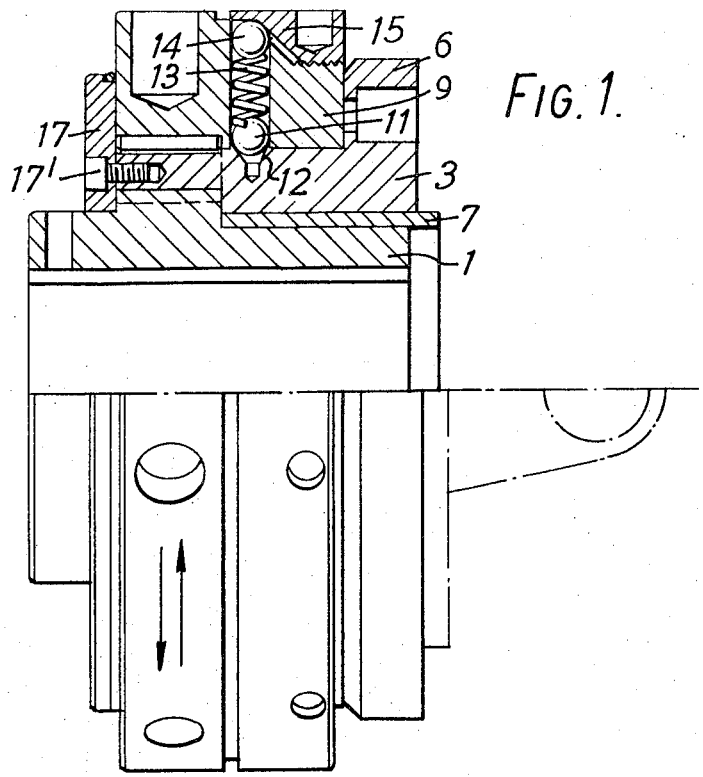
FIG. 1 shows a torque limiting device partly sectioned.
Figure 2:
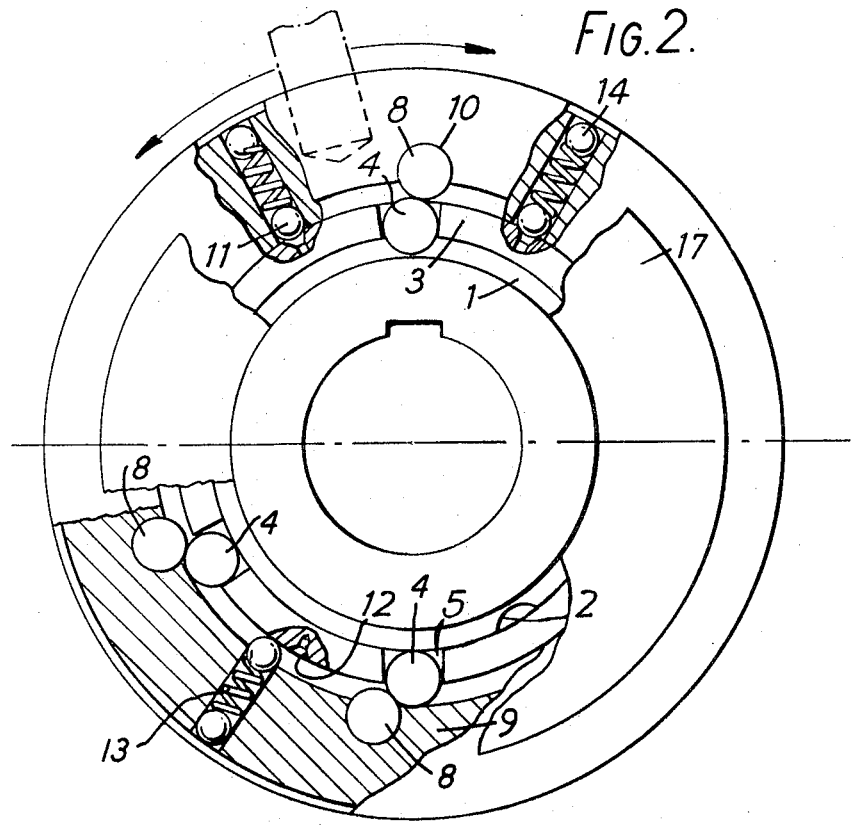
FIG. 2 shows a view in the direction of the arrows II—II of FIG. 1 partly sectioned, the top half showing the device engaged and the bottom half disengaged.

In both embodiments of the invention shown in the drawings a first torque member 1 has a plurality of axial grooves 2 on its outer periphery. A second torque member 3, coaxial with the first torque member 1, carries a plurality of cylindrical drive rollers 4 which are slidable in axial slots 5 having radial sides in the second torque member 3. In the engaged position of the clutch, each of the drive rollers 4 is seated in one of the grooves 2 in the first torque member 1 to transmit torque between the torque members. The second torque member 3 and its integral flange 6 runs with a bearing 7 on the first torque member.

The drive rollers 4 are held in their grooves 2 by means of cam surfaces formed by cylindrical locking rollers 8 which are carried by a locking member 9. Each locking roller 8 is rotatable in a pocket 10 in the locking member 9 and is displaced through an angle θ relative to the drive rollers 4. On overload the drive rollers 4 are forced out of their axial grooves 2, and pushed radially up in their slots 5 thereby forcing the locking rollers 8 aside. The locking member 9 is thus given a small turning movement in the direction A which in the embodiment of FIG. 1 snaps a series of detent balls 11 out of their seatings 12 on another part of the second torque member 3. The detent balls 11 are spring biased into their seatings by springs 13.

A series of pusher balls 14 are urged radially inwards by the inclined face of a screwed adjusting ring 15. The spring force may be adjusted by turning the adjusting ring. To prevent the ring 15 undoing in service, a locking groove is cut in the inclined face which engages one of the pusher balls 14. It will be found that a thin coating of a grease containing molybdenum disulphide on the moving parts of the clutch mechanism ensures consistency and smoothness of disengagement on overload. The second torque member is prevented from sliding off the first torque member by a retaining ring 17 secured by screws 17' to the second torque member 3.

Figure 3:
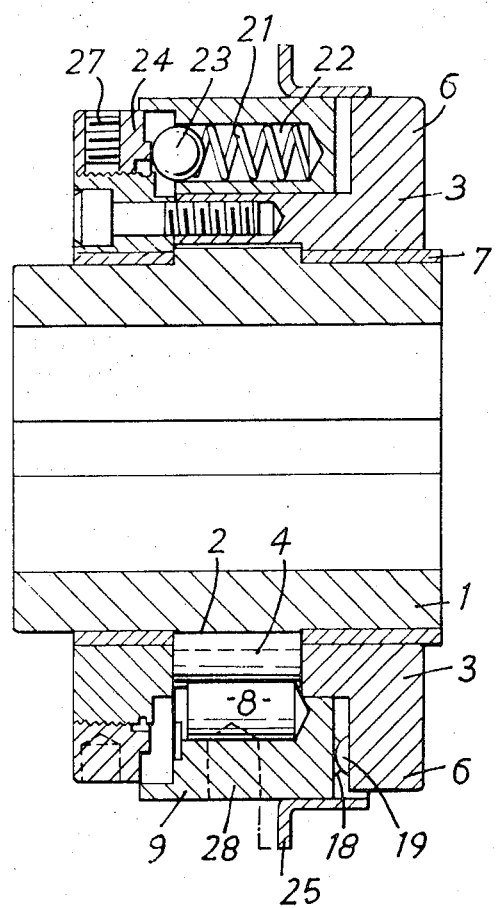
FIG. 3 is an axial section of a second torque limiting device.
Figure 4:
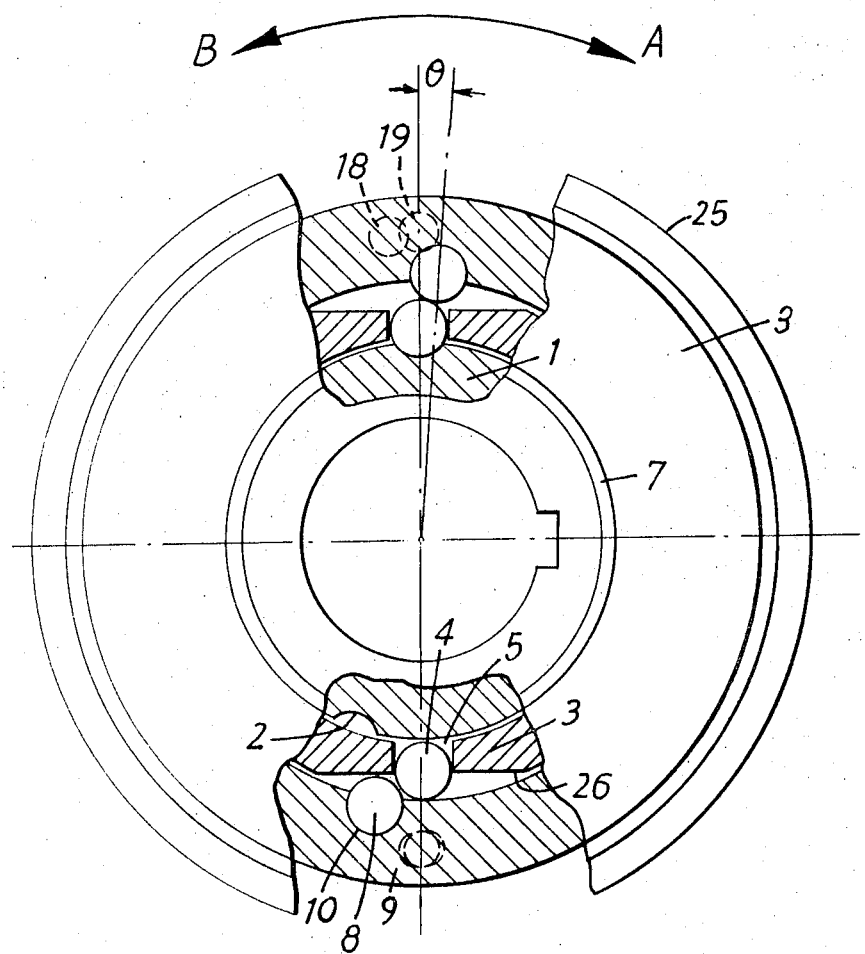
FIG. 4 is an end view of FIG. 3 partly in cross section, the top half of which shows the device engaged and the bottom half disengaged.

In the embodiment of FIGS. 3 and 4, the turning movement of the locking member 9 is resisted by opposed ramps or cam surfaces in the form of balls 18, 19. One set of balls 18 is carried by the locking member 9 and the other set 19 by the flange 6 of the second torque member 3. The riding of the balls 18, 19 over one another is resisted by the spring force produced by a set of springs 21 located in axial pockets 22 around the axis of the clutch. A ball 23 at the end of each spring 21 bears against an adjusting ring 24 which can be turned to adjust the limiting torque value of the clutch. The adjusting ring 24 may be prevented from undoing in service either by a groove in the face of the ring adjacent the ball 23 or by a grub screw 27.

On overload each pair of balls 18 and 19 move on top of each other to a position in which their common axis is parallel to the clutch axis. The second torque member 3 and the locking member 9 then rotate together. The locking member 9 moves to the left (FIG. 3) against the spring force carrying with it a flange 25, the movement of which can be used to trigger a microswitch or other overload sensing device (not shown).

The locking member 9 is prevented from turning any further on overload by contact of the cam surface rollers 8 with ramps 26 on the second torque member adjacent the radial slots 5.

To reset the clutch after releasing on overload, the locking member is turned in the direction of the arrow B by means of a tommy-bar inserted in one of the holes 28.

If a high starting torque is required, a brake band can engage the periphery of the locking member 9 in such a way that the drag torque tends to hold the locking rollers 8 firmly against the drive rollers 4. Upon reaching working speed the brake band can be released and the clutch will trip on overload in a normal manner. Should the direction of rotation be reversed, a brake band can be utilised to disengage the clutch while running. The above mentioned braking functions may also be performed by means of an air, oil or mechanically applied disc brake. If the duration of a high starting torque is extremely short, the clutch can be momentarily prevented from releasing by increasing the mass of the locking member 9 the direction of rotation being suitably selected.

The unit can also work as an isolating clutch by turning the locking member 9 in the appropriate direction by means of a tommy-bar inserted in one of the holes 28. In order to prevent the clutch from engaging in any other than one angular position, a groove in the first torque member 1 is eliminated, together with one drive and one locking roller 4 and 8.

The present invention may also be carried into effect by using balls in place of rollers where shown as items 4 and 8 and allowing the drive balls 4 to rise through holes in the second torque member 3. In this case the cam surface 8 may be formed as a ball or a roller.

What we claim is:

1. A torque limiting device comprising a first torque member having a seating and a second torque member coaxial with said first torque member having an aperture, at least one rolling element seated in said seating and located in said aperture, a locking member carrying at least one cam surface and resilient biasing means resiliently holding said cam surface in contact with said locking member at torque values below a predetermined value, said rolling element being movable in said aperture out of said seating by moving said locking member in a circumferential direction against said biasing means on overload of said device.

2. The device of claim 1 in which an input drive is connected to said second torque member.

3. The device of claim 1 in which said device has three of said rolling elements spaced around the axis of said device and said locking member is a ring which is located radially by co-operation between said cam surfaces and said rolling elements.

4. The device of claim 1 in which said cam surface is formed by a roller held in a pocket in said locking member.

5. The device of claim 1 including means limiting relative rotation between said second torque member and said locking member.

6. The device of claim 5 in which said limiting means comprises ramps on said second torque member.

7. The device of claim 1 in which said rolling element is a roller.

8. The device of claim 1 in which said locking member is resiliently biased by an axial spring force, the resilient biasing means including a pair of cam surfaces located one on said locking member and the other on said second torque member, which bear against each other to prevent relative rotation between said locking member and said second torque member at torque values below said limiting value.

9. The device of claim 8 including axial spring pockets in said locking member and springs in said spring pockets.

10. The device of claim 1 including radial spring pockets in said locking member, a spring in each of said spring pockets, detent seatings in said second torque member and a detent ball at one end of each of said springs which, in the engaged position of said device, is seated in said detent seating.

11. The device of claim 2, in which said device has three of said rolling elements in the form of rollers spaced around the axis of said device, said locking member being a ring which is located radially by cooperation between said cam surface and said rollers, in which the resilient biasing means comprises spring pockets, springs located in said spring pockets and a pair of cam surfaces located one on said locking member and the other on said second torque member, which bear against each other to prevent relative rotation between said locking member and said second torque member at torque values below said limiting value.

12. The device of claim 2, in which said device has three of said rolling elements in the form of rollers spaced around the axis of said device, said locking member being a ring which is located radially by cooperation between said cam surface and said rollers, in which the resilient biasing means comprises radial spring pockets in said locking member, a spring in each of said spring pockets, detent seatings in said second torque member and a detent ball at one end of each of said springs, which, in the engaged position of said device, is seated in said detent seating.

* * * * *